United States Patent [19]

Shifrin

[11] Patent Number: 4,764,009

[45] Date of Patent: Aug. 16, 1988

[54] MEANS FOR EXTENDING SPECTRAL RESPONSE OF SPECTRAL ANALYZING DIRECTION INDICATING APPARATUS

[75] Inventor: Gordon A. Shifrin, Malibu, Calif.

[73] Assignee: Hughes Aircraft Company, Los Angeles, Calif.

[21] Appl. No.: 69,781

[22] Filed: Jul. 6, 1987

[51] Int. Cl.$^4$ .......................... G01J 3/36; G01B 11/26
[52] U.S. Cl. ....................................... 356/73; 356/328
[58] Field of Search ........................... 356/73, 326, 328

[56] References Cited

U.S. PATENT DOCUMENTS

3,992,099 11/1979 Laughlin ............................... 356/73

Primary Examiner—Vincent P. McGraw
Attorney, Agent, or Firm—Lewis B. Sternfels; A. W. Karambelas

[57] ABSTRACT

A spectral analyzer and direction indicator is disclosed and is responsive to collimated or essentially collimated incident radiation. The spectral analyzer and direction indicator includes optical apparatus (13, 15, 113) for providing optical information including diffracted optical information. A detector structure (21, 23, 117) is responsive to the optical information to provide detection output information indicative of incidence direction and spectral content collimated or essentially collimated incident radiation. A processor (20, 120) determines whether the diffraction information includes second order diffraction.

12 Claims, 6 Drawing Sheets

FROM ARRAY 117
↓
PREAMPLIFIERS — 119
↓
SAMPLE & HOLD CIRCUIT — 121
↓
A/D CONVERTERS — 123
↓
PROCESSOR — 125
↓
OUTPUTS

FIG. 9

MEANS FOR EXTENDING SPECTRAL RESPONSE OF SPECTRAL ANALYZING DIRECTION INDICATING APPARATUS

BACKGROUND OF THE INVENTION

The disclosed invention generally relates to a system for extending the spectral response of spectral analyzing and direction indicating apparatus which utilize diffracting elements.

Diffraction elements (e.g., diffraction gratings) may be utilized to provide information as to the incident direction and wavelength of incident essentially collimated radiation. Such use of diffraction elements is based on the diffraction grating equation:

$$\sin \theta = nL/d - \sin I \qquad \text{(Equation 1)}$$

where $\theta$ is the angle of diffraction, I is the angle of incidence, n is the order of diffraction, L is the wavelength, and d is the distance between adjacent rulings on the diffraction grating. The angles $\theta$ and I are measured relative to the normal to the plane of the diffraction element.

Examples of systems which utilize diffraction elements to determine simultaneously both incident direction and wavelength of incident essentially collimated radiation are set forth in U.S. Pat. No. 4,624,566, issued on Nov. 25, 1986, by G. A. Shifrin et al.; U.S. Pat. No. 4,674,871 issued on June 23, 1987, by G. A. Shifrin; U.S. Pat. No. 4,682,888 issued on July 28, 1987, by J. M. Welner; and U.S. Ser. No. 737,114, filed on May 23, 1985, by G. A. Shifrin.

For ease of reference, spectral analyzing and direction indicating systems which utilize diffraction elements shall be referred to herein as diffraction based detection systems.

The use of diffraction elements provides for possible ambiguities. For example, consider two rays R1 and R2 respectively having wavelengths of L1 and L2, where L2 is two times L1, and which have the same incidence angle. On the basis of wavelength alone, the second order diffraction of the ray R1 would be indistinguishable from the first order diffraction of the ray R2. This circumstance would occur, however, only if the detector array (suitably arranged to intercept the diffracted rays) was designed with sufficient field of view to intercept both R1 and R2.

In order to avoid the foregoing ambiguities, the spectral interval over which the diffraction elements can operate is generally limited to one octave. Such limitation may be achieved by limiting the relative wavelength interval falling on a diffraction grating to no more than a factor of two (which corresponds to one octave), or by restricting the angular range intercepted by a detector array to that occupied only by diffracted rays of the first order.

The foregoing limitations on spectral interval can be costly for systems which must provide continuous coverage over a given spectral interval greater than one octave. Specifically, a group of subsystems would be required where each subsystem would cover an interval of no more than one octave.

SUMMARY OF THE INVENTION

It would therefore be an advantage to provide a spectral response extension system for extending the useable spectral response of a diffraction based spectral analyzer and direction indicating system.

Another advantage would be to provide a spectral response extension system which resolves ambiguities in the analysis of diffraction information in a diffraction based spectral analyzer and direction indicating system.

The foregoing and other advantages and features are provided in a spectral analyzer and direction indicator which receives collimated or essentially collimated incident radiation and includes an optical means responsive to the collimated or essentially collimated incident radiation for providing optical diffraction information and optical non-diffraction information. A detector structure is responsive to the optical diffraction information and to the optical non-diffraction information for providing detector output information indicative of (1) incidence direction of the collimated or essentially collimated incident radiation and (2) the spectral content of the collimated or essentially collimated incident radiation. The spectral analyzer and direction indicator system further includes means for processing the detector information to determine whether the diffraction information includes second order diffraction.

A further aspect of the invention is directed to a process for selecting from radiated energy incident on a combination of a non-dispersive optical element and a spectrally dispersive optical element the diffracted energy from the dispersive element and then determining whether the energy from the dispersive element includes both first and second order diffraction from the same incident illumination. The process includes the steps of (a) providing diffraction information from the dispersive optical element, (b) detecting the diffraction information and providing detector outputs indicative of the diffraction information, (c) determining for a selected detector output indicative of diffraction information from said dispersive optical element on whether another detector output indicative of diffraction information from the same dispersive element occurred simultaneously with the selected detector output, (d) determining whether the wavelengths associated with the said simultaneous detector outputs are related by a factor of two, and (e) determining whether the amplitude ratio between the the simultaneous detector outputs is related to a prescribed value.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION OF THE DISCLOSURE

In the following detailed description and in the several figures of the drawing, like elements are identified with like reference numerals.

While the disclosed invention is useful over a great range of wavelengths of essentially collimated radiation (e.g., from ultraviolet to microwave) and for both pulsed and continuous modulation, the disclosed systems will first be described relative to pulsed monochromatic (e.g. laser) radiation. This will facilitate the understanding of the principles involved, which can then be applied to other sources of radiation.

Figure 1:
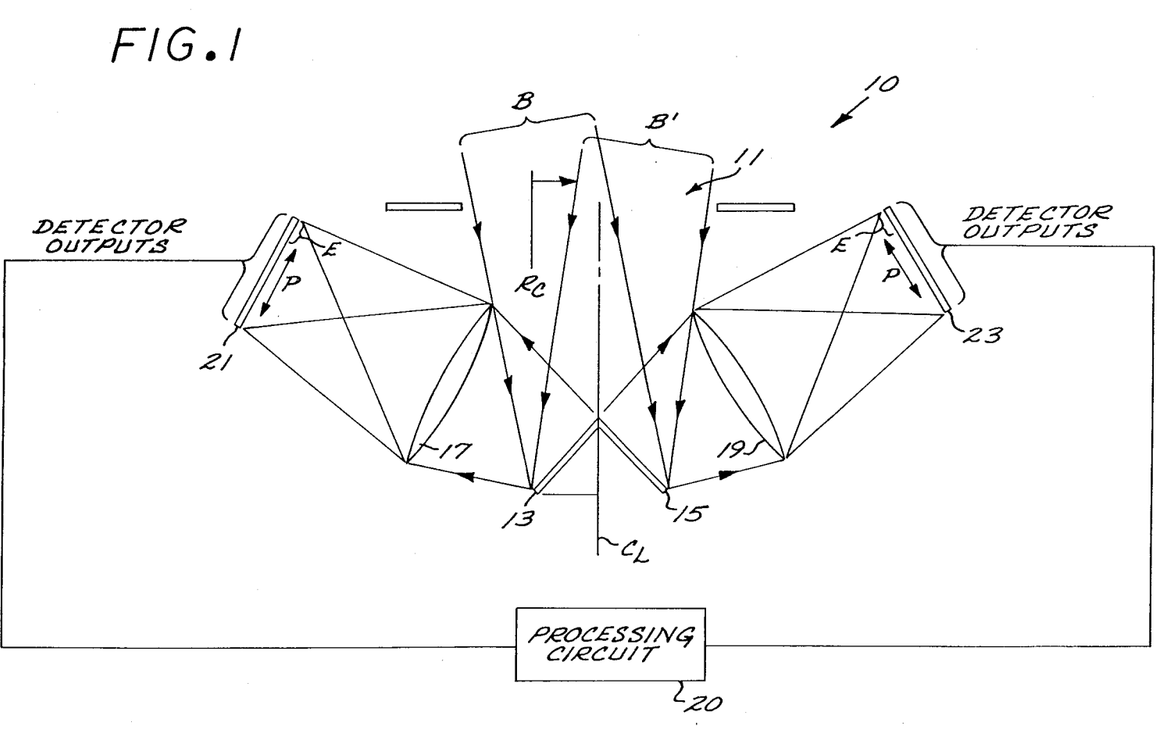
FIG. 1 is a schematic diagram of a diffraction based spectral analyzer and direction indicating system which utilizes the disclosed spectral response extension system.

Referring now to FIG. 1, schematically shown therein is a one-axis spectral analyzer system 10 which includes an aperture 11, a left-side reflection grating 13, and a right-side reflection grating 15. The rulings on the gratings 13 and 15 are normal to the plane of the paper. The gratings are inclined toward each other and meet at their respective edges closest to the aperture 11. The gratings 13 and 15 are symmetrically inclined relative to a centerline $C_L$ which is normal to aperture 11 and passes through the center of the aperture 11. The gratings 13 and 15 are matched as to blaze angle and the number of rulings per millimeter (mm). The lower distal edges of the gratings 13 and 15 and the perimeter of the aperture 11 define a field of view (FOV) which is centered about the FOV centerline $C_L$.

The grating 13 has an associated analytical optical system 17, illustrated schematically as a simple lens; and the grating 15 also has an associated analytical optical system 19 which is illustrated schematically as a simple lens. The respective optical systems 17 and 19 function to collect and focus the diffracted rays from the respective gratings 13 and 15. A linear detector array 21 receives the focused rays from the optical system 17, and a linear detector array 23 receives the focused rays from the optical system 19. The linear detector arrays 21, 23 include elongated detector elements which are normal to the plane of FIG. 1. Thus, the linear detector arrays 21, 23 resolve position along a direction perpendicular to the longer dimension of the elongated detector elements. Such direction is indicated by the double arrow P.

The dimension of the linear detector arrays 21, 23 along the direction P is chosen to accommodate the extended spectral range of the system, which is greater than one octave. In other words, the interval over which each of the linear detector arrays 21, 23 resolves position is increased. The extended portions E of the linear detector arrays 21, 23 relative to a one octave subtense are schematically shown in FIG. 1. Specifically, such extended portions are located at the top portions of the linear detector arrays 21, 23.

Although reflection gratings are disclosed in this description, other dispersive elements, such as transmissive gratings and refractive prisms, can be utilized with appropriate optical systems and detector systems.

FIG. 1 shows a beam B and another beam B' which illustrate the limits of the angular position relative to the centerline $C_L$ of an incoming beam which would be detected by the spectral analyzer and direction indicator system 10.

As will be readily apparent, the one-axis system 10 provides angular information in association with diffractive action of the grating in the plane of the drawing (i.e., in the direction perpendicular to the rulings of the grating). Angular information in association with the non-diffractive action of the grating (i.e., in the direction parallel to the rulings) also is available. Such angular displacements (non-diffractive action) can be incorporated into the overall FOV of the system without actual measurement by suitable lengthening of the elements in the detector array without segmentation. These angular displacements can be measured, however, by introducing suitable segmentation of elements in the detector array.

The analytical optical systems 17 and 19 must be able to collect and focus rays diffracted over the entire angular subtense emanating from reflection gratings 13 and 15. Both the extended FOV (i.e., the subtense of allowable input beam angles) and the extended spectral interval (i.e., the range of allowable spectral values from sources) contribute to the possible range of angular subtense from the grating.

The fields of view of the analytical optical systems 17, 19 are chosen to accommodate both the overall field of view (FOV) of the system as well as the extended spectral interval of the disclosed system, which is greater than one octave.

The incidence of essentially monochromatic (e.g., from a laser) radiation will produce on each detector array 21 and 23 a focused area that is a relatively small spot whose actual size depends on the optical design of the particular instrument. As discussed below, the positions of the focused spots on the detectors 21 and 23 depend on both the wavelength and the direction (angle) of the incoming laser beam.

The spectral analyzer and direction indicator system 10 in essence includes two electro-optical channels wherein each channel is separate and independent, and each generates its own information. One channel includes the left side reflection grating 13, the optical system 17, and the detector array 21; and the other channel includes the right side reflection grating 15, the optical system 19, and the detector array 23.

Figure 2:
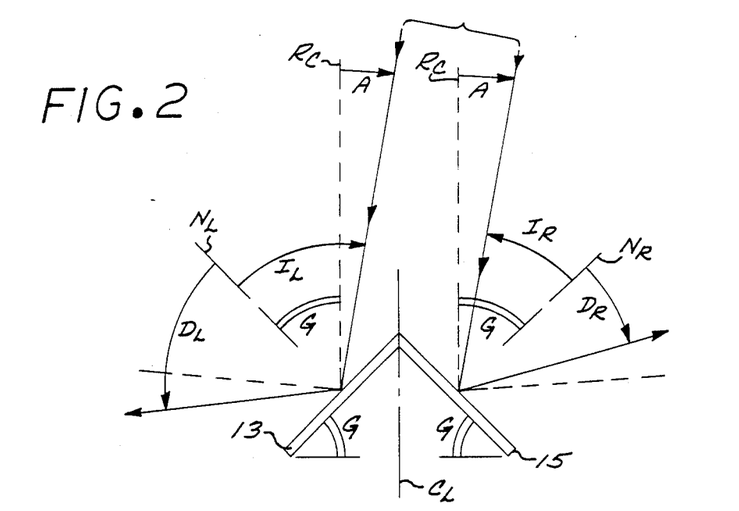
FIG. 2 is a schematic elevation diagram illustrating the parameters and sign conventions used in describing the spectral analyzer and direction indicating system of FIG. 1.

For ease of discussion, the parameters and sign conventions for the spectral analyzer system 10 are shown in FIG. 2. The beam angle A is the angle of an incoming beam relative to the centerline $C_L$, and is shown relative to a reference line $R_C$ which is parallel to the centerline $C_L$. The beam angle A is positive in the clockwise direction.

Relative to a line perpendicular to the centerline $C_L$, the left side reflection grating 13 and the right side reflection grating 15 are each inclined at an angle G. For symmetry and convenient analysis, the reflection gratings 13 and 15 are each inclined at the same angle G. By way of example, the angle G may be 45 degrees and would be set as required by the particular optical design.

In FIG. 2, the convention is such that angles of rays (measured with respect to the normal) on opposite sides of a normal to a reflection grating have opposite algebraic signs.

Associated with the left side reflection grating 13 is a line $N_L$ which is normal to the surface of the grating 13. The angle of incidence of $I_L$ of the incoming beam as to the left side reflection grating 13 is measured relative to the normal $N_L$. The angle $I_L$ is positive in the clockwise direction. The angle of diffraction $D_L$ as to the left side reflection grating 13 is measured relative to the normal $N_L$. The angle $D_L$ is negative in the counter clockwise direction.

Associated with the right side reflection grating 15 is a line $N_R$ which is normal to the surface of the grating 15. The angle of incidence $I_R$ of the incoming beam as to the right side reflection grating 15 is measured relative to the normal $N_L$. The angle of incidence $I_R$ is positive in the counter clockwise direction. The angle diffraction $D_R$ as to the right side reflection grating 15 is measured relative to the normal $N_R$. The angle $D_R$ is negative in the clockwise direction.

With equal grating inclination angles G, the angles of incidence $I_L$ and $I_R$ are related as follows:

$$I_L = G + A \quad \text{(Eq. 2)}$$

$$I_R = G - A \quad \text{(Eq. 3)}$$

$$I_L + I_R = 2\dot{G} \quad \text{(Eq. 4)}$$

Thus, for a given incoming beam within the FOV, the sum of the angles of incidence on the reflection gratings 13 and 15 is always equal to twice the inclination angle G.

The following grating equation is applicable to the left side grating 13:

$$\sin D_L = \frac{nW}{d} - \sin I_L \quad \text{(Eq. 5)}$$

The symbols represent the following:

TABLE I

| | |
|---|---|
| $I_L$: | angle of incidence, left side |
| $D_L$: | angle of diffraction, left side |
| W: | wavelength |
| n: | order of diffraction |
| d: | spacing of adjacent rulings on grating |

Relative to the right side reflection grating 15, a similar grating equation is applicable:

$$\sin D_R = \frac{nW}{d} - \sin I_R \quad \text{(Eq. 6)}$$

The symbols represent the following:

TABLE II

| | |
|---|---|
| $I_R$: | angle of incidence, right side |
| $D_R$: | angle of diffraction, right side |
| W: | wavelength |
| n: | order of diffraction |
| d: | spacing of adjacent rulings on grating |

An expression for coherence length L is:

$$L = \frac{W^2}{\pi \Delta W} \quad \text{(Eq. 7)}$$

where $\Delta W$ is the spectral bandwidth in the radiation. Since the spectral analyzer and direction indicator can yield values for both wavelength and spectral bandwidth, coherence length can be obtained from measured quantities to within an upper limit set by the spectral resolution of any particular instrument.

In the disclosed system 10, the reflection gratings 13 and 15 are substantially matched as to blaze angle and number of rulings per mm. By way of example, each of the reflection gratings 13 and 15 is ruled at 600 lines per mm. The reflection gratings 13 and 15 are blazed so that first order diffraction dominates.

From Equations 5 and 6, it follows that the angle of diffraction depends on both angle of incidence and wavelength of the incident radiation. A single grating cannot be utilized for simultaneous and separate determination of angle of incidence and wavelength since those two parameters are inextricably mixed. For example, the angle of diffraction of an incoming beam having a wavelength of 1064 nanometers (nm) entering at a beam angle of +10 degrees is the same as that for an incoming beam having a wavelength of 694 nm entering at a beam angle of −2.77 degrees.

In operation, the location of the images on the linear detector arrays 21 and 23 will depend on both the wavelength and angle of incidence (or beam angle) of the optical radiation within the FOV of the detector system 10. The beam angle and the angle of incidence have a fixed relationship that depends on the specific optical and mechanical design used to implement the detector system 10. When the incident light is collimated, the diffracted light will also be collimated. For a laser source, a focused spot is produced on each of the detector arrays 21 and 23. The location of each focused spot on the detector array provides a measure of the angle of diffraction which, as discussed above, is a function of both beam angle and wavelength.

For a point source that is spectrally broad, the image on each detector array will not be a single focused spot but will be an image that occupies an angular interval along each array whose extent is determined by the spectral content of the source. The radiation received by each detector element contains a small range of angles of diffraction from the grating (representing the element's field of view); the signal level in that element represents the radiation intercepted by the element integrated over that interval of the spectrum associated with the field of view of the element. Thus, both the spectral signature of the point source (to the extent resolved by the detector array) and its angular position within the FOV can be determined when the information contained in these illuminated detector elements is suitably interpreted.

The respective values for beam angle (A) and wavelength (W) can be determined from the left and right angles of diffraction ($D_L$, $D_R$) as follows:

$$A = \arcsin \frac{\sin D_R - \sin D_L}{2 \cos G} \quad \text{(Eq. 8)}$$

$$W = \frac{d}{2n} (\sin D_L + \sin D_R + 2 \sin G \cos A) \quad \text{(Eq. 9)}$$

From the foregoing Equation 8, the beam angle A is determined and its value is substituted in Equation 9 to yield the wavelength W.

Figure 3:
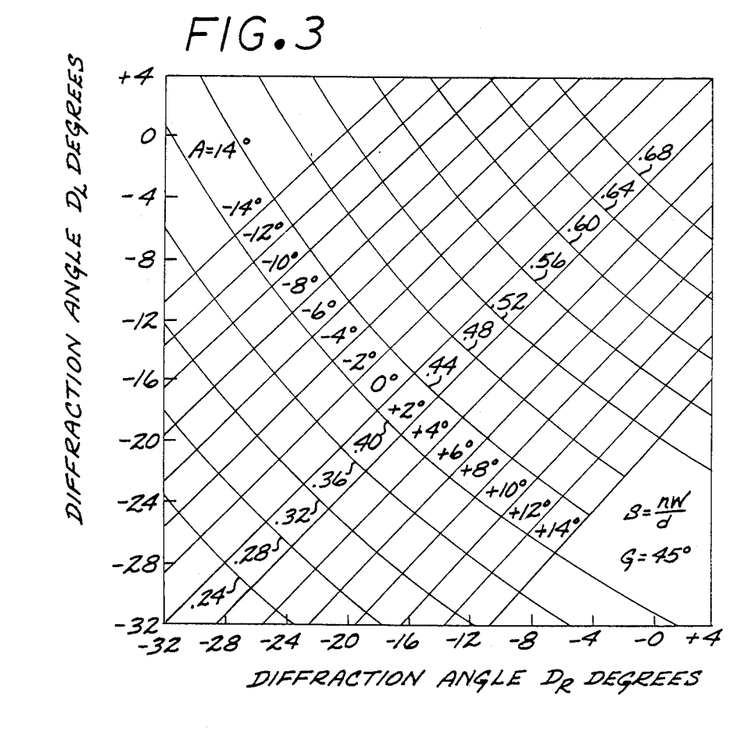
FIG. 3 is a plot showing the relationship between two angles of diffraction observed independently and simultaneously and the corresponding values of wavelength and direction for the two channels of the spectral analyzer and direction indicator system of FIG. 1.

FIG. 3 shows the general relationship between the two observed angles of diffraction ($D_L$ and $D_R$) and the corresponding values of wavelength (W) and beam angle (A) for a single-axis spectral analyzer and direction indicator for the system 10 of FIG. 1. Actually in FIG. 3, wavelength has been generalized with the parameter nW/d so that the curves can be applied to any wavelength and to any grating. The curves for this figure were obtained using Equations 8 and 9 given above. The coordinates of the figure are the two angles of diffraction observed at the detector arrays. The plot itself consists of two families of curves. One family contains curves of constant beam angle; the other family contains curves of constant wavelength. Any combination of two angles of diffraction establishes a location on the plot. This same location uniquely defines the corresponding values of wavelength and direction. Thus, a single monochromatic source occupies one spot on the plot. Several simultaneous monochromatic sources located in various parts of the field-of-view would occupy appropriate locations on the plot, but they would be clearly separated. If these monochromatic sources are of the same wavelength, then they would be distributed along the corresponding curve of constant wavelength. An angularly small source that is spectrally broad would be spread out along one line of constant direction (beam angle) but would intersect a range of curves of constant wavelength. This spread in wavelength corresponds to the spectral bandwidth of the source. Thus, FIG. 3 illustrates many performance features of the spectral analyzer and direction indicator.

The outputs of the detector arrays 21, 23 are provided to a processing circuit 20 which processes such outputs to determine wavelength and beam angle (incidence direction) of the illumination incident on the gratings 13, 15. More specifically, since each of the elements of the detector arrays 21 and 23 provides an indication of the respective angles of diffraction, the images on the detector arrays 21 and 23 are utilized to provide appropriate angular values. Such angular values are then utilized to calculate beam angle (A) and wavelength (W) in accordance with Equations 8 and 9.

In systems with less stringent resolution requirements which can employ stored look-up tables of manageable size to determine wavelength and direction, Equations 8 and 9 can be utilized to generate the values for such look-up tables. Alternatively, the look-up tables can be generated empirically.

Figure 7:
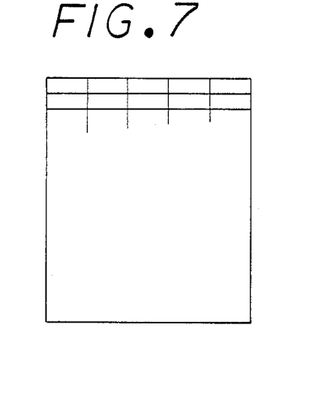
FIG. 7 is a plan view of a segmented detector array.

In the spectral analyzer system 10, the elements of the detector arrays 21 and 23 are elongated elements which are arranged parallel to the rulings on the reflection gratings 13 and 15. That is, the longer dimension of the elements extends normally to the plane of FIG. 1. The detector arrays 21 and 23 may be segmented as illustrated in FIG. 7, or they may consist of individual elements whose longer dimensions span the entire width of each array.

For ease of reference to position on the detector arrays 21 and 23, the incidence angles of the images from the respective diffraction gratings 13 and 15 may be resolved into planar angles measured in two orthogonal planes, where one of such planes is parallel to the plane of FIG. 1, while the other plane is orthogonal thereto and parallel to the rulings on elements 13 and 15.

Figure 4:
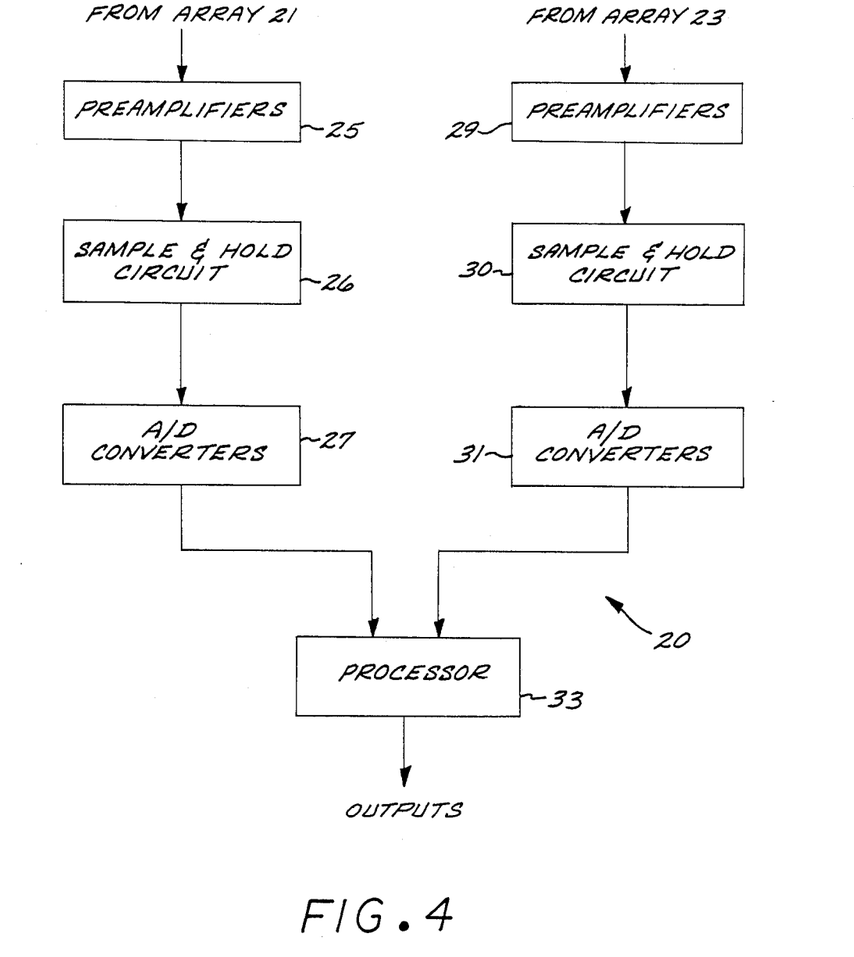
FIG. 4 is a block diagram of the processing circuit for one of the channels of the disclosed spectral response extension system.

Referring particularly to FIG. 4, shown therein is a block diagram of the processing circuit 20 which includes a plurality of preamplifiers 25 for respectively amplifying the outputs of the detector array 21. A plurality of sample-and-hold circuits 26 are responsive to the amplified detector array outputs and provide sampled detector array outputs. A plurality of analog-to-digital converters 27 are responsive to the sampled detector array outputs provided by the sample-and-hold circuits 26 and convert them to digital detector outputs.

The processing circuit 20 further includes a plurality of preamplifiers 29 for respectively amplifying the outputs of the detector array 23. A plurality of sample-and-hold circuits 30 are responsive to the amplified detector array outputs and provide sampled detector array outputs. A plurality of A/D converters 31 are responsive to the sampled detector outputs provided by the sample-and-hold circuits 30 and convert them to digital detector outputs. The digital detector array outputs for the detector array 21 and the digital detector array outputs of the detector array 23 are provided to a processor 33 for use in determining characteristics such as wavelength, angle of arrival, and coherence length of incident illumination. Such processing is based on the prior discussion of the diffraction equation relative to the left and right side gratings 13, 15.

Each of the detector elements of the detector array 21 may have a corresponding preamplifier, sample and hold circuit, and A/D converter in the plurality of preamplifiers 25, the plurality of sample and hold circuits 26, and the plurality of A/D converters 27. Each of the detector elements of the detector array 23 may have a corresponding preamplifier, sample and hold circuit, and A/D converter in the plurality of preamplifiers 29, the plurality of sample and hold circuits 30, and the plurality of A/D converters 31. With such arrangement, the processor 33 may be adapted to process in parallel all outputs provided by the detector arrays 21, 23. Alternatively, the processor 33 may provide for multiplexed processing.

By way of further example, the preamplifiers 25, the sample-and-hold circuits 26, and the A/D converters 27 may provide for multiplexed processing; and the preamplifiers 29, the sample-and-hold circuits 30, and the A/D converters 31 may also provide for multiplexed processing. With such arrangement, the processor 33 may be adapted to process the digital detector outputs in parallel or may provide for further multiplexed processing.

The processor 33 is adapted to provide a plurality of outputs including spectral content and incidence direction information as to the illumination incident on the gratings 13, 15.

The analytical optical systems 17, 19, the diffraction gratings 13, 15, and the detector arrays 21, 23 have the capability of operating over a spectral band that is greater than one octave for the wavelengths of interest. Such an operating range would result in ambiguities since the detector arrays 21, 23 are capable of intercepting first order and some second order diffractions of the same incident illumination. Such ambiguities are analyzed and recognized by the invention pursuant to the following observed characteristics of first and second order diffractions of the same incident illumination.

A first characteristic is that when both first and second order diffractions of the same incident illumination are intercepted by the detector arrays 21, 23 such diffractions occur simultaneously. That is, first and second order diffractions of the same incident illumination as diffracted by one of the gratings 13, 15 would occur simultaneously. Another characteristic is that the indicated wavelength due to a true second order diffraction that is regarded as a first order diffraction will be precisely twice that of the indicated wavelength due to the corresponding first order diffraction. A third observed characteristic is that for an appropriately designed system which maximizes the energy of first order diffractions, there is an established amplitude relationship between the detector outputs for the intercepted first and second order diffractions. Specifically, the second order diffraction will cause a detector output having a considerably lower level than the detector output resulting from the corresponding first order diffraction. For example, the first and second orders of diffraction may have a typical ratio of five to one.

Figure 5:
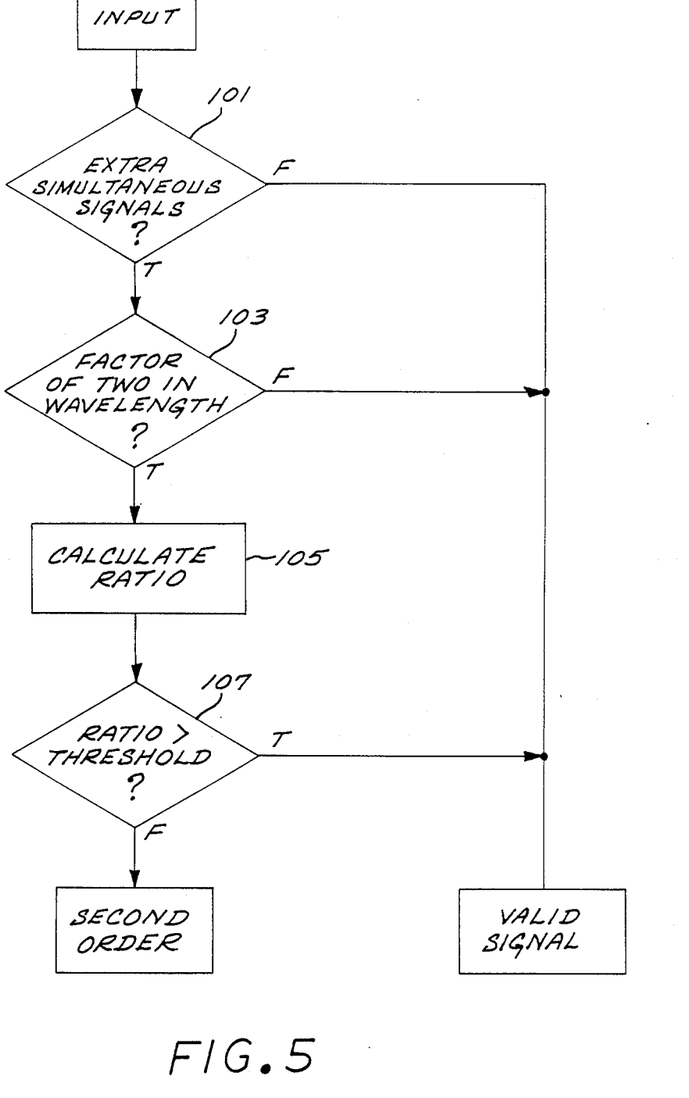
FIG. 5 is a flowchart of the analytical process provided by the disclosed spectral response extension system.

Referring generally to FIG. 5, shown therein is a flowchart of the processing provided by the processor 33 to avoid ambiguity due to the extended spectral response of the disclosed diffraction based spectral analyzer and direction indicator 10. Basically, the process is directed to determining whether diffracted energy intercepted by the detector arrays 21, 23 has any of the above discussed observed characteristics of second order diffraction. If it does, then it is recognized as second order diffraction. Stated another way, if diffracted energy is determined not to possess any one of the above characteristics of second order diffraction, then it is recognized as being valid first order diffraction.

Referring specifically to FIG. 5, the output of each detector element in each detector array indicative of incident illumination is analyzed pursuant to the process set forth in the flow chart. Each detector array is analyzed individually. The detector output being analyzed is referred to as the selected detector output.

Pursuant to a decision block 101, a determination is made as to whether another output was provided simultaneously by the same detector array that provided the selected detector output. Such simultaneity may preferably be limited to a short observation interval in the microsecond range to provide a sufficiently severe test to eliminate spurious combinations of events, such as noise pulses or spikes. If the result is False, then the selected detector output is a valid first diffraction. If the result is True, then the process proceeds to a decision block 103. Any such other detector output that was provided simultaneously shall be referred to as a candidate detector output.

Pursuant to the decision block 103, a determination is made whether the wavelengths indicated for a candidate detector output and for the selected detector output are related by a factor of two. That is, the wavelength ratio could be either two or one-half, depending on the manner in which it was formed. If the result is False, then the selected detector output is a valid first order diffraction. If the result is True, then the process proceeds to a function block 105.

Pursuant to the function block 105, the ratio of (a) the amplitude of the selected detector output to (b) the amplitude of a candidate detector output is calculated. Pursuant to a decision block 107, the calculated ratio is compared to a predetermined value. Depending on how the ratio is formed, it can be less than or greater than some predetermined threshold value, resulting from how the processing system has been arranged to register True or False. If the result is True, then the selected detector output is a valid first order signal, and the candidate signal that (a) occurred simultaneously with the selected detector output and (b) has an indicated wavelength of twice that of the selected wavelength is a second order signal that should be disregarded. If the result is False, then both the selected detector output and the candidate signal cannot be distinguished from valid first order signals.

As discussed previously, the threshold against which the calculated ratio is compared may be on the order of five or more. It should be understood that such a ratio is a calibrated parameter that is a function of the design and construction of a particular system.

Figure 6:
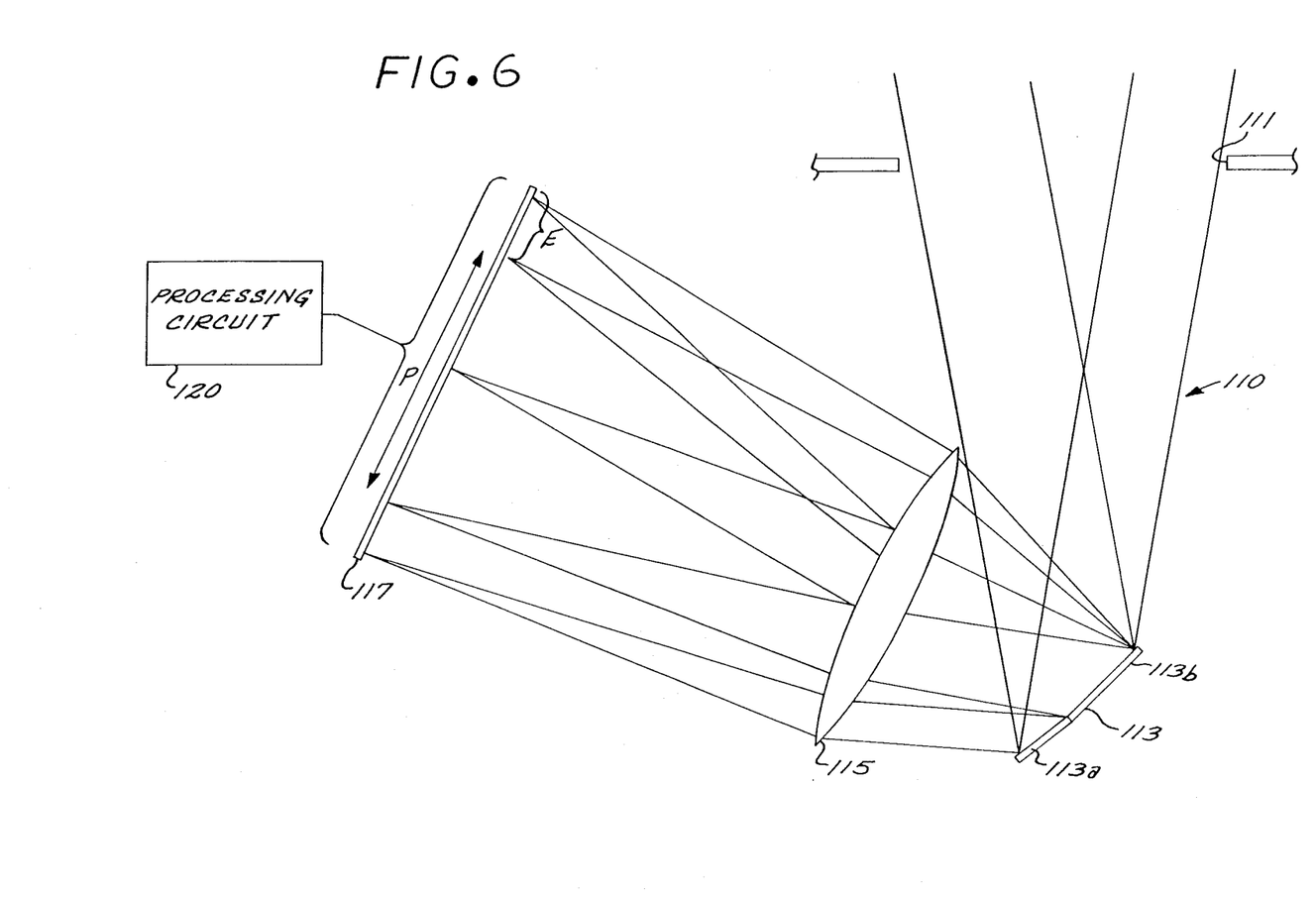
FIG. 6 is a schematic diagram of a spectral analyzer and direction indicating system that utilizes a combination of a diffractive and a non-diffractive element and the disclosed response extension system.

Referring now to FIG. 6, schematically shown therein is another spectral analyzer and direction indicator system 110 which embodies the invention. The spectral analyzer system 110 includes an aperture 111 and a reflector 113. The reflector 113 includes a non-ruled planar section 113a and a ruled section 113b. The rulings of the ruled section 113b are orthogonal to the plane of FIG. 6.

An analytical optical system 115, illustrated schematically as a simple lens, functions to collect and focus the reflected and diffracted rays from the respective reflector sections 113a, 113b. A detector array 117 receives the focused rays from the analytical optical system 115. The detector array 117 may be segmented as illustrated in FIG. 7, or it may consist of individual elements whose longer dimensions span the entire width of the array. The outputs of the detector elements of the detector array 117 are provided to a processing circuit 120.

The system 110 has a system field of view (FOV) which defines the range of allowable incidence beam angles and is generally determined by the size of the aperture 111 and the size of the reflector 113. The analytical optical system 115 has an internal field of view that accommodates the overall system FOV and the extended spectral interval of the disclosed system, which is more than one octave.

If the elements of the detector array 117 are segmented, they provide a grid of detector elements wherein segments are arranged orthogonally to the plane of FIG. 6. FIG. 7 illustrates the incident side of the segmented detector array 117.

The location on the segmented detector array 117 of an image reflected by the non-ruled reflector section 113a will depend solely on the angle of incidence of the optical radiation within the field of view of the detector system 110. Specifically, the location of the image on the detector array 117 provides information as to a solid incidence angle within the FOV of the system.

Through the geometrical relationship between ruled element 113b and non-ruled element 113a, the system is arranged so that the non-diffracted image can always be distinguished from a diffracted image. For example, within any group of images (1) the non-diffracted image always can be located at one end of the group and (2) in all operational conditions that relationship or order of position within the group of images for the non-diffracted image would never be interchanged with a diffracted image. The non-diffracted image thus can always be selected and identified through its ordered location and distinguished from the associated diffracted images. Similarly, diffracted images also can be selected from the group of images for processing to determine if second order diffraction is present.

For ease of reference to position on the detector array 117, the incidence angle of the image reflected by the non-ruled reflector section 113a may be resolved into planar angles measured in two orthogonal planes, where one of such planes is parallel to the plane of FIG.

6, while the other plane is orthogonal thereto and parallel to the rulings on the ruled reflector section 113b.

The location on the detector array 117 of an image diffracted by the ruled reflector section 113b will depend on both the wavelength and angle of incidence within the field of view of the detector system 110. As a result of the direction of the rulings on the ruled reflector section 113b, the pertinent angles of incidence and diffraction are measured in a plane that is parallel to the plane of FIG. 6 (i.e., orthogonal to the rulings on the ruled reflector section 113b). Such angle of incidence is provided by the non-diffracted image reflected from the non-ruled reflector section 113a. Simultaneously, the diffracted image from section 113b provides information on both wavelength and angle of incidence of the radiation illuminating section 113b.

It should be appreciated that the foregoing referenced angles of incidence and diffraction are measured by position on the detector array 117 along the direction P identified by the double arrow. As a result of the extended spectral range of the system 110, the dimension of the detector array 117 along the direction P is increased relative to that for a one octave system. The extended portion E of the detector array 117 relative to a one octave subtense is schematically shown in FIG. 6.

Figure 8:
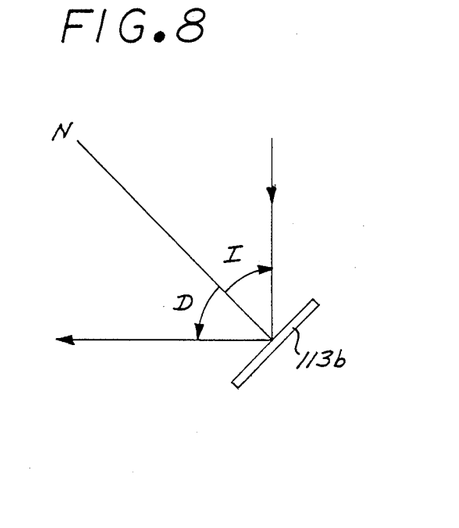
FIG. 8 is a diagram illustrating the angle of incidence and the angle of diffraction relative to the normal to the plane of a diffractive element.

Referring specifically to FIG. 8, shown therein is the ruled reflector section 113b with identifications of the angles of incidence I and the angle of diffraction D, which are measured relative to a normal N to the ruled reflector section 113b. The angles set forth in FIG. 8 are in accordance with the convention discussed above relative to FIG. 2. The following grating equation is applicable:

$$\sin D = \frac{nW}{d} - \sin I \qquad \text{(Eq. 10)}$$

The symbols represent the following values:
I = angle of incidence
D = angle of defraction
W = wavelength
n = order of defraction
d = spacing of adjacent rulings on ruled reflector section Since the angle of incidence is known from the image provided by the non-ruled reflector section 113a and since the angle of defraction is known from the position of the image provided by the ruled reflector 113b, Equation 11 can be solved for wavelength W as follows:

$$W = \frac{d}{n} [\sin D + \sin I] \qquad \text{(Eq. 11)}$$

It should therefore be appreciated that the combination of the reflected and diffracted images provided by the non-ruled reflector section 113a and the ruled reflector section 113b for the same incident illumination provides information as to incident direction as well as wavelength. It should also be appreciated that the incoming beam angle discussed relative to the field of view (FOV) of the system must be distinguished from the incidence angle discussed relative to Equation 10 above. However, these two incidence angles have a fixed relationship which depends on the specific geometry utilized to implement the system 110.

Figure 9:
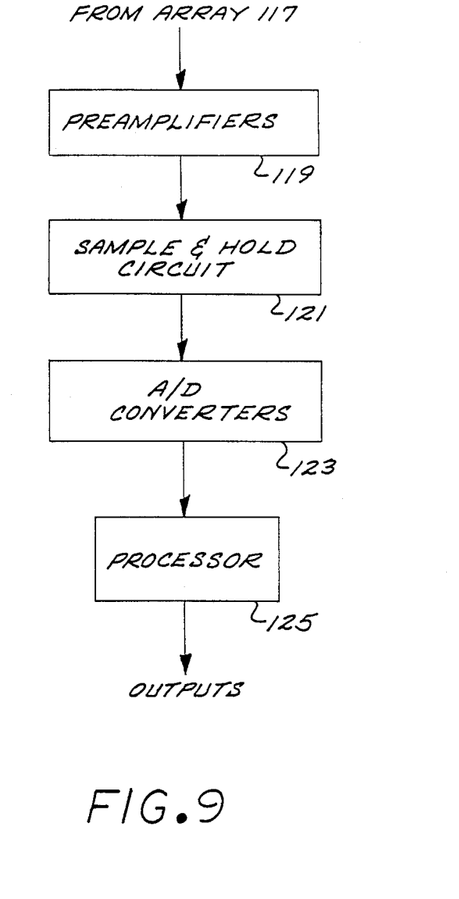
FIG. 9 is a block diagram of the processing circuit on a channel used in the system of FIG. 6.

Referring now to FIG. 9, shown therein is a block diagram of the processing circuit 120 which includes a plurality of preamplifiers 119 for respectfully amplifying the outputs of the detector array 117. A plurality of sample and hold circuits 121 are responsive to the amplified detector array outputs and provide sampled detector array outputs. A plurality of analog to digital converters 123 are responsive to the sampled detector array outputs and convert them to digital detector outputs.

The digital detector outputs provided by the analog to digital converters 123 are provided to a processor 125 for use in determining characteristics such as spectral content (wavelength), incoming beam angle, and coherence length of incident illumination.

Each of the detector elements of the detector array 117 may have a corresponding preamplifier, sample and hold circuit, and A/D converter in the plurality of preamplifiers 119, the plurality of sample and hold circuits 121, and the plurality of A/D converters 123. With such arrangement, the processor 125 may be adapted to process in parallel all outputs provided by the detector array 117. Alternatively, the processor 125 may provide for multiplexed processing.

By way of further example, the preamplifiers 119, the sample and hold circuits 121, and the A/D converters 123 may provide for multiplexed processing. With such arrangement, the processor 125 may be adapted to process the digital detector outputs in parallel or may provide for further multiplexed processing.

The processor 125 is adapted to provide a plurality of outputs including spectral content and incidence direction and information as to the illumination incident on the reflector 113.

The reflector 113, the analytical optical system 115, and the detector array 117 have the capability of operating over a spectral band that is greater than one octave for the wavelengths of interest. Such an operating arrangement can result in ambiguities since the detector array 117 is capable of intercepting first order and some second order defractions of the same incident illumination. The previously described process set forth in FIG. 5 is utilized by the processor 125 in accordance with the invention to analyze and recognize such ambiguities.

It should be appreciated that while the foregoing embodiments of the invention have been described in the context of pulsed incident radiation, the invention clearly applies to continuous incident radiation.

The foregoing has been directed to the extension of the spectral response beyond one octave of diffraction based spectral analyzer and direction indicating systems, and to the resolution of ambiguities in the analysis of diffraction information from such extended spectral response. The invention achieves unambiguous spectral response extension with little additional hardware and the use of some extra processing. Use of the invention is significantly advantageous when providing coverage over a spectral interval greater than one octave. In comparison to utilizing a sequence of conventional one-octave systems, a smaller number of systems with extended spectral response can be employed to cover the same spectral range.

Although the foregoing has been a description and illustration of specific embodiments of the invention, various modifications and changes thereto can be made by persons skilled in the art without departing from the scope and spirit of the invention as defined by the following claims.

What is claimed is:

1. A spectral analyzer and direction indicator system for receiving collimated or essentially collimated incident radiation comprising:
   optical means responsive to the collimated or essentially collimated incident radiation for providing optical diffraction information and optical non-diffraction information;
   detector means responsive to said optical diffraction information and to said optical nondiffraction information for providing detector output information indicative of (1) incidence direction of the collimated or essentially collimated incident radiation and (2) a combination of both the spectral content and the incidence direction of the collimated or essentially collimated incident radiation; and
   means for processing said detector information to determine whether said diffraction information includes second order diffraction.

2. The spectral analyzer system of claim 1 wherein said diffraction information is provided by an optically dispersive element and said non-diffraction information is provided by an optically reflective element.

3. The spectral analyzer and direction indicator system of claim 1 wherein said processing means determines that a selected detector output indicative of a combination of both spectral content and incidence direction is the result of a second order diffraction if (1) another detector output indicative of a combination of both spectral content and incidence direction occurs simultaneously with the selected detector output, (2) the wavelengths associated with the said simultaneous detector outputs are related by a factor of two, and (3) the amplitude ratio between the said selected detector output and the said simultaneous detector output is related to a prescribed value.

4. A spectral analyzer and direction indicator system for receiving collimated or essentially collimated incident radiation comprising:
   optical means responsive to the collimated or essentially collimated incident radiation for providing (a) non-dispersed optical information indicative of incidence direction and (b) spectrally dispersed optical information;
   detector means responsive to said non-dispersed optical information and to said dispersed optical information for providing detected information for identifying as to the collimated or essentially collimated incident radiation incidence direction and the spectral content; and
   means for processing said detected information to determine whether said diffraction information includes second order diffraction.

5. The spectral analyzer and direction indicator of claim 4 wherein said optical means comprises a reflector having a ruled planar section and a smooth non-ruled planar section.

6. The spectral analyzer and direction indicator of claim 4 wherein said detector means comprises a detector array.

7. The spectral analyzer and direction indicator of claim 6 wherein said processing means determines that a selected detector output is the result of second order diffraction if (1) another detector output occurred simultaneously with the selected detector output, (2) the wavelengths associated with the selected detector output and any other simultaneous detector output are related by a factor of two, and (3) the ratio of amplitudes between the selected detector output and any other simultaneous detector output is related to a predetermined value.

8. A spectral analyzer and direction indicator system for receiving collimated or essentially collimated incident radiation comprising:
   first optical means responsive to the collimated or essentially collimated incident radiation for providing first optical diffraction information;
   second optical means responsive to the collimated or essentially collimated incident radiation for providing second optical diffraction information;
   first and second detector arrays respectively responsive to said first and second optical diffraction for providing detector outputs indicative of the spectral content and incidence direction of the collimated or essentially collimated incident radiation; and
   means for processing said detected information to determine whether said diffraction information includes second order diffraction.

9. The spectral analyzer and direction indicator system of claim 8 wherein said processing means determines that a selected detector output is the result of second order diffraction if (1) another detector output occurred simultaneously on the same detector array of the selected detector output, (2) the wavelengths associated with the selected detector output and any other simultaneous detector output are related by a factor of two, and (3) the ratio of amplitudes between the selected detector output and any other simultaneous detector output is related to a predetermined value.

10. A process for selecting from radiated energy incident on a combination of a non-dispersive optical element and a spectrally dispersive optical element the diffracted energy from said dispersive element and then determining whether the energy from said dispersive element includes both first and second order diffraction from the same incident illumination, comprising the steps of:
    providing diffraction information from the dispersive optical element;
    detecting the diffraction information and providing detector outputs indicative of the diffraction information;
    determining for a selected detector output indicative of diffraction information from said dispersive optical element whether another detector output indicative of diffraction information from the same dispersive element occurred simultaneously with the selected detector output;
    determining whether the wavelengths associated with the said simultaneous detector outputs are related by a factor of two; and
    determining whether the amplitude ratio between the said simultaneous detector outputs is related to a prescribed value.

11. A process for determining whether diffracted energy provided by a dispersive element and intercepted by a detector includes both first and second order diffraction for the same incident illumination, comprising the steps of:
    determining for a selected detector output whether another detector output from the same dispersive element occurred simultaneously with the selected detector output;
    determining whether the wavelength associated with any other detector output from the dispersive element that occurred simultaneously with the selected detector output is related to the wavelength of the selected output by a factor of two;

determining whether the ratio of the amplitude of the selected output to the amplitude of any detector other output from the dispersive element that occurred simultaneously with the selected output and whose wavelength is related to the wavelength of the selected output by a factor of two is related to a prescribed value; and providing an output indicating that the selected detector output is a valid first order diffraction if any of the foregoing determinations is negative.

12. A process for determining whether diffracted energy includes both first and second order diffraction from the same incident illumination, comprising the steps of:

providing diffraction information from first and second dispersive elements which are responsive to the same incident illumination;

detecting the diffraction information and providing detector outputs indicative of the diffraction information;

determining for a selected detector output whether another detector output from the same dispersive element occurred simultaneously with the selected detector output;

determining whether the wavelength associated with any detector output from the same dispersive element that occurred simultaneously with the selected detector output is related to the wavelength of the selected output by a factor of two;

determining whether the ratio of the amplitude of the selected output to the amplitude of any detector output from the same dispersive element that occurred simultaneously with the selected output and whose wavelength is related to the wavelength of the selected output by a factor of two is related to a prescribed value; and providing an output indicating that the selected detector output is a valid first order diffraction if any of the foregoing determinations is negative.

* * * * *